United States Patent [19]
Loeffler et al.

[11] Patent Number: 5,200,511
[45] Date of Patent: Apr. 6, 1993

[54] CHOLOROTRIAZINE DYES WITH TWO AZO CHROMOPHORES EXHIBITING FURTHER REACTIVE GROUPS

[75] Inventors: Hermann Loeffler, Speyer; Manfred Patsch, Wachenheim, both of Fed. Rep. of Germany

[73] Assignee: Basf Aktiengesellschaft, Ludwigshafen, Fed. Rep. of Germany

[21] Appl. No.: 860,139

[22] Filed: Mar. 30, 1992

[30] Foreign Application Priority Data

Apr. 27, 1991 [DE] Fed. Rep. of Germany ....... 4113838

[51] Int. Cl.$^5$ .................... C09B 62/09; C09B 62/533; D06P 1/38
[52] U.S. Cl. .................... 534/634; 534/581; 534/631; 534/633; 534/635; 534/637; 8/436; 8/549
[58] Field of Search ................ 534/634, 637, 631, 635

[56] References Cited

U.S. PATENT DOCUMENTS

| | | | |
|---|---|---|---|
| 3,223,470 | 12/1965 | Boedeker et al. | 534/637 |
| 4,485,041 | 11/1984 | Hoyer et al. | 534/637 |
| 4,988,802 | 1/1991 | Loeffler et al. | 534/634 |

FOREIGN PATENT DOCUMENTS

| | | |
|---|---|---|
| 0387579 | 9/1990 | European Pat. Off. |
| 0387589 | 9/1990 | European Pat. Off. |
| 2748975 | 5/1979 | Fed. Rep. of Germany |
| 2007698 | 5/1979 | United Kingdom |

OTHER PUBLICATIONS

Patent Abstracts of Japan, JP-A-69,163/1985, Apr. 19, 1985, "BIS:AZO CPD. for Dyeing Textiles-with High Fastness to Light, Sweat, Washing, Acid, Alkali, Abrasion and Ironing".
Journal of the Society of Dyers and Colourists, vol. 104, 1988, pp. 425-431, M. Matsui, et al., "Dye-Fibre Bond Stabilities of Bifunctional Reactive Dyes Containing a Monochlorotriazine and a . . . ".
Patent Abstracts of Japan, JP-A-40,686/1977, Mar. 29, 1977, "Dyeing Cellulosic Fibres-Giving Prods. of High Wet Strength".
Patent Abstracts of Japan, JP-A-27,628/1987, Mar. 13, 1978, "DIS:AZO Dyes Suitable for Cellulosic Fibres--Prepd. by Reacting Suitable Mono:AZO CPD.Sith Di:Amine".

Primary Examiner—Mary C. Lee
Assistant Examiner—Fiona T. Powers
Attorney, Agent, or Firm—Oblon, Spivak, McClelland, Maier & Neustadt

[57] ABSTRACT

Reactive dyes of the formula

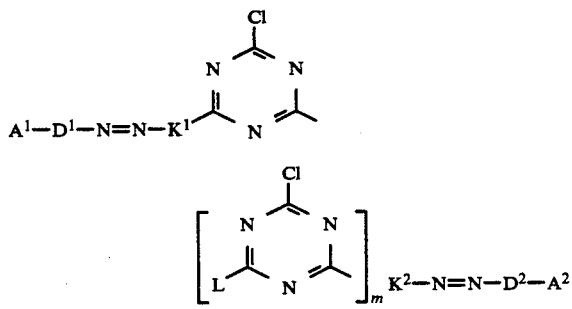

where
  m is 0 or 1,
  $A^1$ and $A^2$ are different and each is a fiber-reactive radical or else, in the case of $A^2$, hydrogen,
  $D^1$ and $D^2$ are substituted or unsubstituted phenylene, substituted or unsubstituted phenylenemethyl, substituted or unsubstituted naphthylene or substituted or unsubstituted naphthylenemethyl,
  $K^1$ and $K^2$ are each the radical of a coupling component of the aminonaphthalenesulfonic acid series and
  L is a bridge member, are useful for dyeing and printing hydroxyl- or nitrogen-containing substrates.

7 Claims, No Drawings

CHLOROTRIAZINE DYES WITH TWO AZO CHROMOPHORES EXHIBITING FURTHER REACTIVE GROUPS

The present invention relates to novel reactive dyes of the formula I

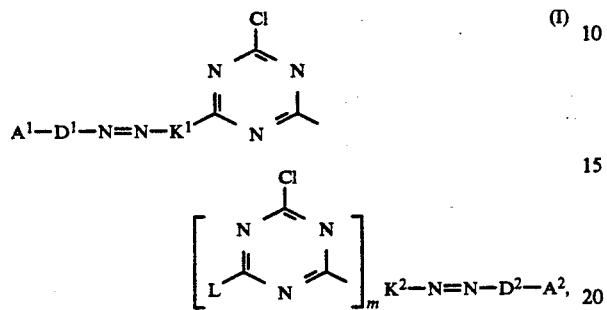

where
- m is 0 or 1,
- $A^1$ and $A^2$ are different from each other and each is a fiber-reactive radical or else, in the case of $A^2$, hydrogen,
- $D^1$ and $D^2$ are identical or different and each is independently of the other substituted or unsubstituted phenylene, substituted or unsubstituted phenylenemethyl, substituted or unsubstituted naphthylene or substituted or unsubstituted naphthylenemethyl,
- $K^1$ and $K^2$ are identical or different and each is independently of the other the radical of a coupling component of the aminonaphthalenesulfonic acid series, and
- L is a bridge member, and also to the use thereof for dyeing or printing hydroxyl- or nitrogen-containing organic substrates.

JP-A-69 163/1985 discloses reactive dyes which differ from those of the formula I in that $A^1$ and $A^2$ are each a combined bireactive radical based on monochlorotriazinyl and 2-sulfatoethylsulfonyl. It has been found that these dyes still have applicational defects. For example, they either lack stability to alkaline and-/or peroxide-containing detergents or give too low a color yield at the customary dyeing temperature (see J. Soc. Dyers Col. 104, (1988), 425–431).

Similarly, the dyes known from DE-A-1 265 698, DE-A-2 748 965 of DE-A-2 748 975, which possess three or four reactive groups based on monochlorotriazinyl and vinylsulfonyl, have defects. For instance, they are not very stable to alkali and are only moderately fast to peroxide-containing detergents.

Finally, the dyes described in JP-A-40 686/1977 and JP-A-27 628/1978, which have four monochlorotriazinyl-based reactive groups, are very unreactive. As a result, they either require a high dyeing temperature or else a long dyeing time.

It is an object of the present invention to provide novel reactive dyes which are based on azo dyes and which have a plurality of reactive groups. The novel dyes shall be highly stable to alkali and oxidizing detergents and show favorable reactivity in the dyebath.

We have found that this object is achieved by the reactive dyes of formula I defined at the beginning.

Fiber-reactive radicals $A^1$ and $A^2$ are those which react substitutively or additively with the hydroxyl- or nitrogen-containing groups of the substrates to be treated, in the presence or absence of proton acceptors.

Suitable additively fiber-reactive radicals $A^1$ and $A^2$ are for example vinylsulfonyl, 2-chloroethylsulfonyl, and a 2-hydroxyethylsulfonyl radical which has been esterified with an inorganic or organic acid and forms vinylsulfonyl under dyeing conditions.

Suitable substitutively fiber-reactive radicals are for example halogen-substituted radicals of 1,3,5-triazine, quinoxaline, phthalazine, pyrimidine or pyridazone, and a 2-alkylsulfonylbenzothiazole radical.

specific examples are: $-SO_2-C_2H_4OSO_3H$, $-SO_2-C_2H_4OPO_3H_2$, $-SO_2-C_2H_4OCOCH_3$, $-SO_2-C_2H_4-Cl$

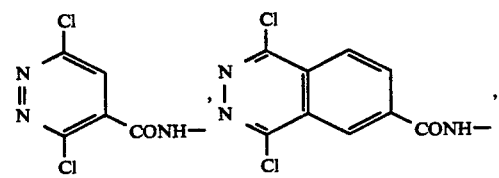

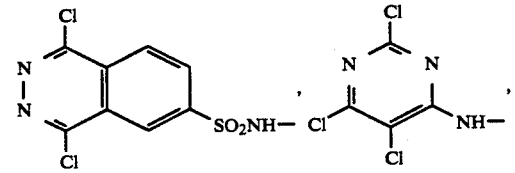

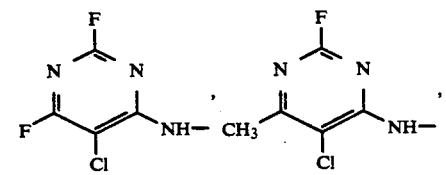

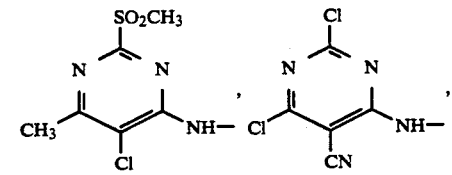

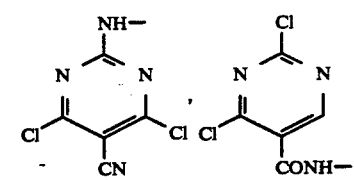

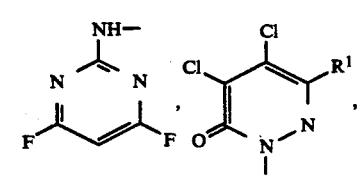

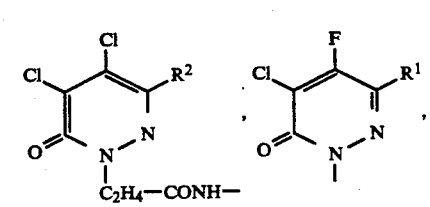

-continued

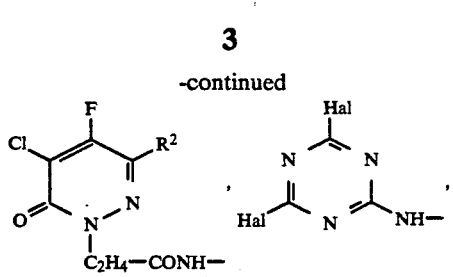

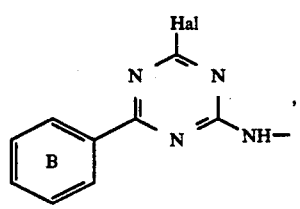

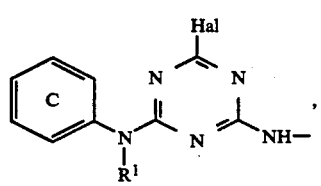

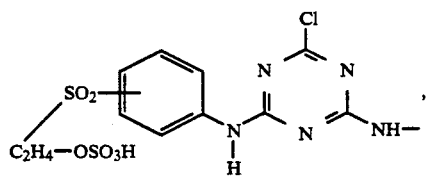

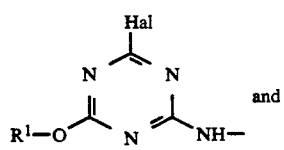

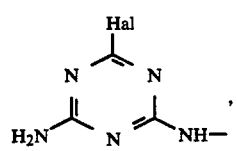

where Hal is fluorine or chlorine, R¹ is C₁–C₆-alkyl, which may be interrupted by one or two oxygen atoms in ether function, R² is hydrogen or nitro, and the rings B and C may each be monosubstituted or disubstituted by hydroxysulfonyl and/or carboxyl, and independently thereof ring C may additionally be substituted by chlorine, nitro, methoxy or methyl.

The radicals D¹ and D² are each substituted or unsubstituted phenylene, substituted or unsubstituted phenylenemethyl, substituted or unsubstituted naphthylene or substituted or unsubstituted naphthylenemethyl. Suitable substituents are, for example, hydroxysulfonyl, carboxyl, C₁–C₄-alkyl, C₁–C₄alkoxy, unsubstituted or hydroxysulfonyl- and nitro-substituted styryl, and unsubstituted or C₁–C₄-alkyl- and hydroxysulfonyl-substituted benzothiazolyl. If D¹ or D² is substituted, it generally has from 1 to 3 substituents.

D¹ and D² are each for example 1,3- or 1,4-phenylene or a radical of the formula

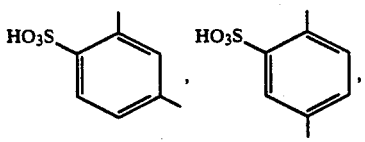

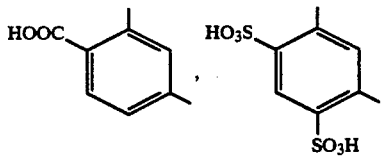

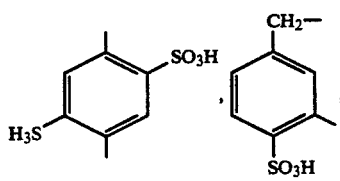

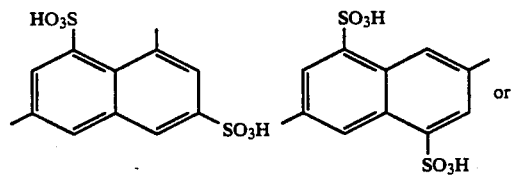

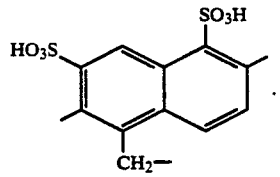

If A² is hydrogen, suitable D²—H also includes for example phenyl and radicals of the formulae

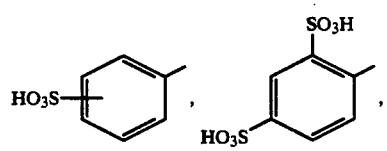

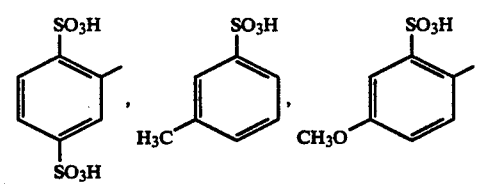

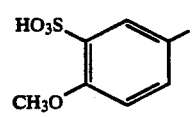

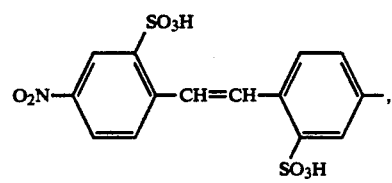

-continued

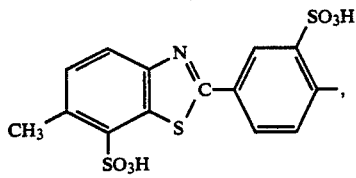

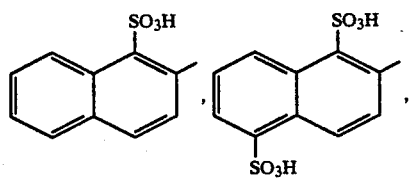

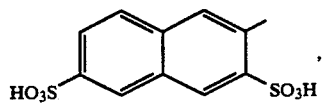

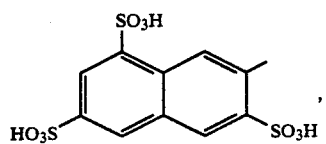

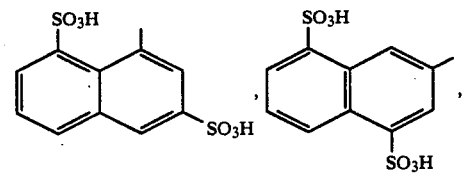

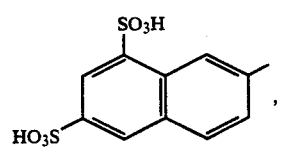

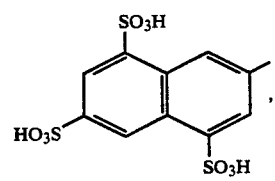

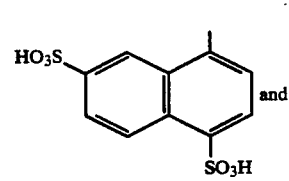

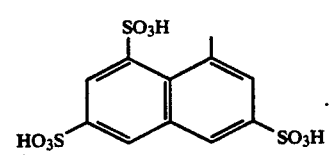

The radicals $K^1$ and $K^2$ are each derived from a coupling component of the aminonaphthalenesulfonic acid series. Suitable coupling components conform for example to the formula II

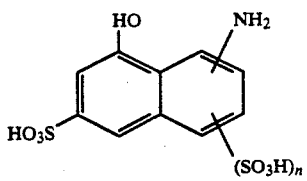 (II)

where n is 0 or 1.

Specific examples are the following components:

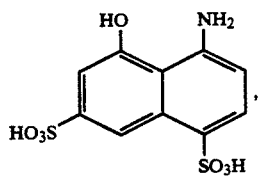 (IIa)

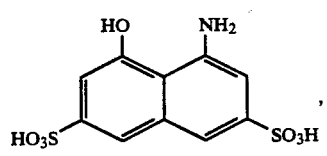 (IIb)

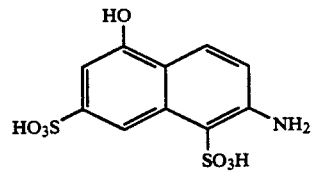 (IIc)

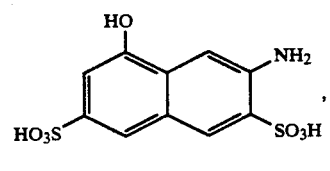 (IId)

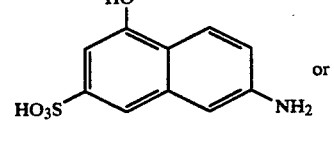 (IIe)

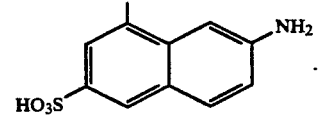 (IIf)

A suitable bridge member L conforms for example to the formula

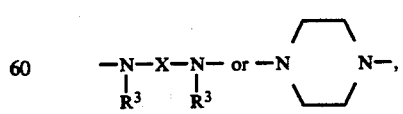

where $R^3$ is hydrogen or $C_1$–$C_4$-alkyl and

X is $C_2$–$C_6$-alkylene or the abovementioned radical $D^1$.

Of note are reactive dyes of the formula Ia

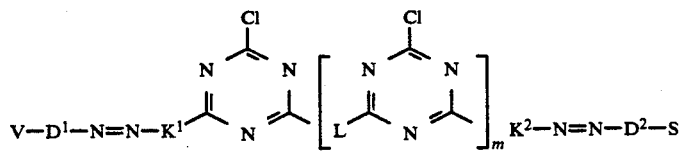
(Ia)

where
V is 2-chloroethylsulfonyl or a 2-hydroxyethylsulfonyl radical which has been esterified with an inorganic or organic acid and forms vinylsulfonyl under dyeing conditions,
S is a substitutively fiber-reactive radical, and
$D^1$, $D^2$, $K^1$, $K^2$, L and m are each as defined above.

Also of note are reactive dyes of the formula Ib

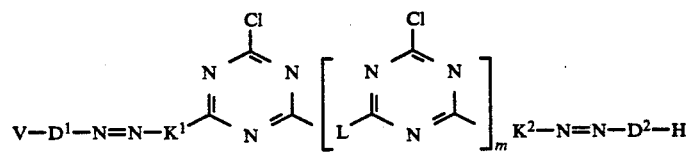
(Ib)

where V, $D^1$, $D^2$, $K^1$, $K^2$, L and m are each as defined above.

Also of note are reactive dyes of the formula Ic

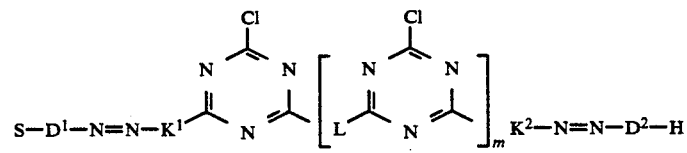
(Ic)

where S, $D^1$, $D^2$, $K^1$, $K^2$, L and m are each as defined above.

Preference is given to reactive dyes of the formula I where m is 0.

Preference is further given to reactive dyes of the formula I where $D^1$ and $D^2$ are each independently of the other unsubstituted or hydroxysulfonyl-monosubstituted or -disubstituted phenylene or unsubstituted or hydroxysulfonyl-monosubstituted, -disubstituted or -trisubstituted naphthylene.

Particular preference is given to the reactive dyes of the formula Ia, Ib or Ic where
V is the radical —$SO_2$—$C_2H_4$—$OSO_3H$ and
S is the radical

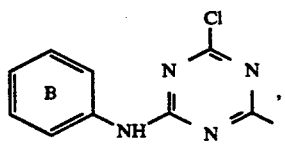

where the ring B may be monosubstituted or disubstituted by hydroxysulfonyl.

Of particular note are reactive dyes of the formula Ia, Ib or Ic where $K^1$ is the radical of the formula IIa and $K^2$ is a radical of the formula IIb, IIc, IId, IIe or IIf.

Also of particular note are reactive dyes of the formula Ia, Ib or Ic where $K^1$ is a radical of the formula IIb, IIc, IId, IIe or IIf and $K^2$ is the radical of the formula IIa.

Also of particular note are reactive dyes of the formula Ia, Ib or Ic where $K^1$ is a radical of the formula IIa or IIb and $K^2$ is a radical of the formula IIa or IIb.

Of special note are reactive dyes of the formula Ia, Ib or Ic where $K^1$ is the radical of the formula IIa and $K^2$ is a radical of the formula IIb, IIe or IIf or $K^1$ and $K^2$ are each a radical of the formula IIa or IIb.

Of particular importance are reactive dyes of the formula Ia, Ib or Ic where $K^1$ is the radical of the formula IIa and $K^2$ is the radical of the formula IIb or $K^1$ and $K^2$ are each a radical of the formula IIa or IIb.

The preparation of the reactive dyes of the formula I according to the present invention can be carried out in a conventional manner. For example, it is possible to diazotize an amine of the formula IIIa $$A^1—D^1—NH_2 \quad \text{(IIIa)}$$

where $A^1$ and $D^1$ are each as defined above, in an aqueous mineral acid medium and then couple the diazonium salt at about pH 4–8 with a naphthalenetriazine derivative of the formula IV

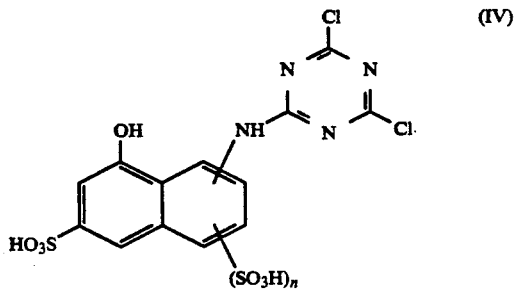
(IV)

where n is as defined above.

The resulting intermediate of the formula V

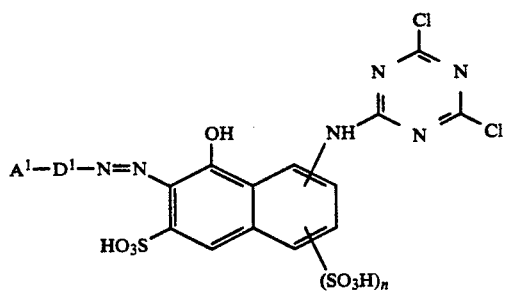

(V)

where $A^1$, $D^1$ and n are each as defined above, can then be reacted (if m is 0) with a naphthalene compound of the abovementioned formula II at about pH 4-6 and 0°-40° C. to give the product of the formula VI

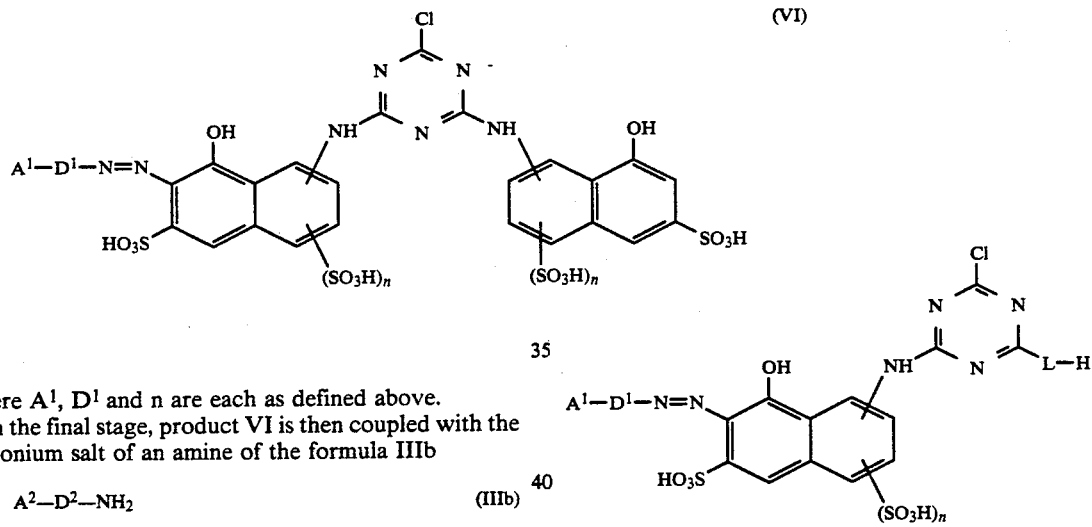

(VI)

where $A^1$, $D^1$ and n are each as defined above.

In the final stage, product VI is then coupled with the diazonium salt of an amine of the formula IIIb $A^2$—$D^2$—$NH_2$ (IIIb)

where $A^2$ and $D^2$ are each as defined above, to give the dye of the formula VII

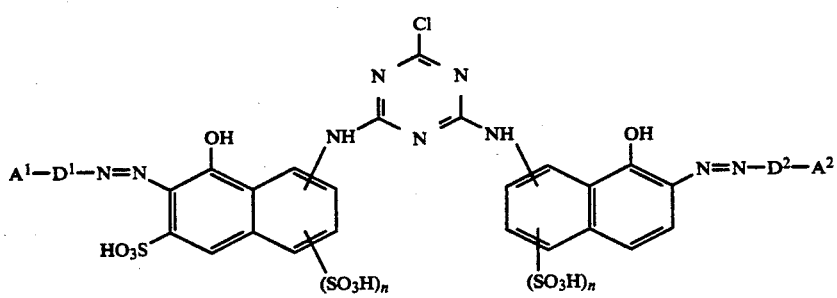

(VII)

where $A^1$, $A^2$, $D^1$, $D^2$ and n are each as defined above.

The synthesis of dye VII may also be carried out in reverse order, which is in fact advantageous when the electrophilicity of the diazonium salt of amine IIIb is higher than that of the diazonium salt of the amine IIIb.

To prepare those dyes where m is 1, one way is to react intermediate V at about pH 4-8 and 0°-40° C. with one equivalent of a diamine of the formula VIII

H—L—H (VIII), where L is as defined above, and react the resulting compound of the formula IX (IX)

where $A^1$, $D^1$, L and n are each as defined above, either under the abovementioned conditions with a further equivalent of naphthalenetriazine derivative IV or stepwise first with cyanuric chloride at from 0° to 20° C. and then with the naphthalene compound II at from 0° to 40° C., forming a ditrazine compound of the formula X

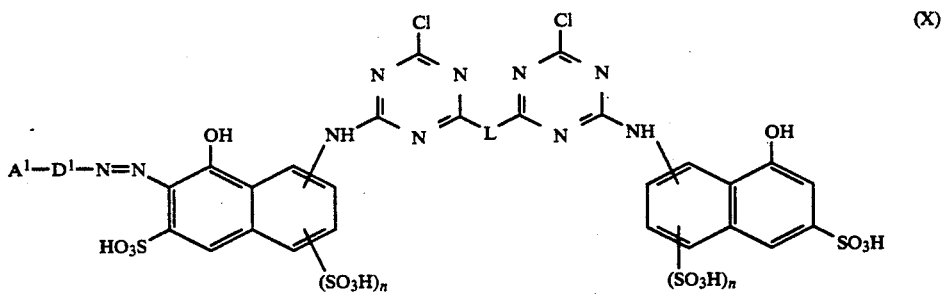

where $A^1$, $D^1$, L and n are each as defined above.

In the final stage, the ditriazine compound X is then coupled with the diazonium salt of an amine of the formula IIIb $$A^2—D^2—NH_2 \qquad \text{(IIIb)}$$

where $A^2$ and $D^2$ are each as defined above, to form the dye of the formula XI

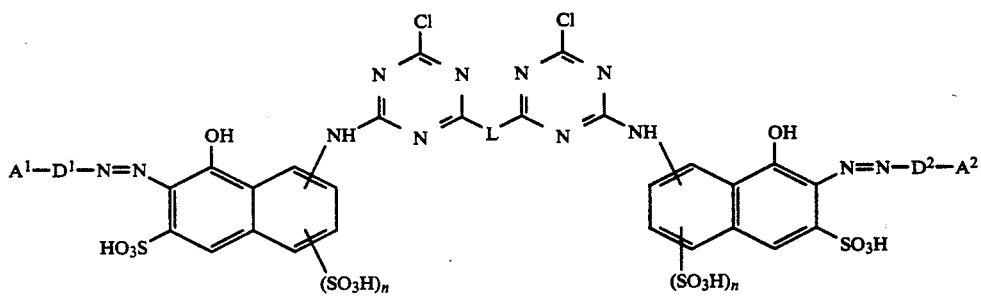

where $A^1$, $A^2$, $D^1$, $D^2$, L and n are each as defined above.

The synthesis of the dye XI may also be carried out in reverse order.

The novel reactive dyes of the formula I are advantageous for dyeing and printing hydroxyl- or nitrogen-containing organic substrates. Such substrates are for example leather or fiber material which predominantly contains natural or synthetic polyamides or natural or regenerated cellulose. Then noval dyes are preferably used for dyeing and printing textile material based on wool or in particular cotton.

They dye cotton by the padding method at room temperature or by the exhaust method at from 40° to 60° C. with a very high degree of fixation and in a very high color strength, and the dyeing times are short.

Embodiments of the invention will now be more particularly described by way of example.

EXAMPLE 1 a) 30.3 g of the sodium salt of 4-(2-sulfatoethylsulfonyl)aniline were dissolved in 500 ml of ice-water and admixed with 30 ml of aqueous 3.33N sodium nitrite solution. The diazotization reaction was carried out by adding 30 ml of 30% by weight hydrochloric acid and stirring at 0°-5° C. for one hour. After excess nitrous acid had been destroyed with amidosulfuric acid, the dispersion of the diazonium salt was combined with a solution of 1-(4,6-dichloro-1,3,5-triazin-2-yl)amino-8-hydroxynaphthalene-4,6-disulfonic acid which had been prepared in the meantime as follows:

A solution of 36.3 g of the disodium salt of 1-amino-8-hydroxynaphthalene-4,6-disulfonic acid and 25 g of sodium formate in 150 ml of water was added with intensive stirring to an ice-cooled dispersion of 18.5 g of cyanuric chloride, 0.1 g of a wetting agent, 1 ml of 30% by weight hydrochloric acid and 200 ml of ice-water, and the mixture was stirred for two hours at 5°-10° C. and a pH of 1 until the reaction had ended.

The coupling reaction was completed by buffering with sodium acetate solution (pH of about 3) and 30 minutes' stirring at 10°-15° C.

To the dispersion of the dichlorotriazinyl azo dye thus obtained there were then added 34.1 g of the monosodium salt of 1-amino-8-hydroxynaphthalene-3,6-disulfonic acid, a pH of 5-5.5 was set with sodium bicarbonate sprinkled in, and the temperature rose to 20° C. The mixture was stirred at 20°-25° C. and maintained at the abovementioned pH for two hours to complete the reaction, and the dye of the formula

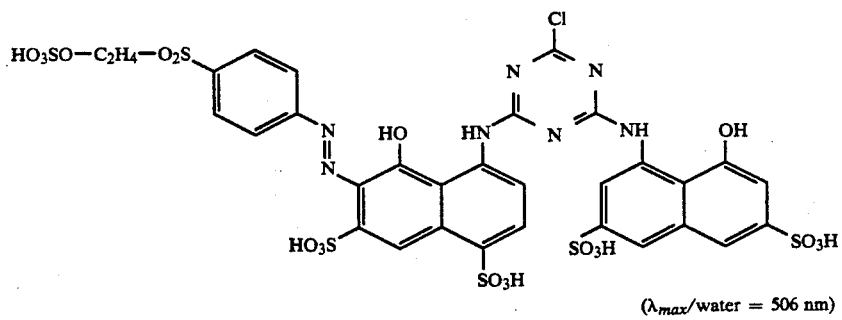

($\lambda_{max}$/water = 506 nm)

was precipitated in full with potassium chloride, filtered off with suction and washed with 5% by weight potassium chloride solution.

b) To 0.05 mol of the couplable dye thus obtained, dissolved in 250 ml of water, there was added the equivalent amount of the diazonium salt of aniline-2-sulfonic acid, obtained as a dispersion in an aqueous hydrochloric acid medium using sodium nitrite. Buffering with sodium acetate to about pH 5 and stirring at 20° C. completed the coupling reaction. The dye of the formula c) Synthesis in reverse order, i.e. coupling of the diazonium salt of aniline-2-sulfonic acid with 1-(4,6-dichloro-1,3,5-triazin-2-yl)amino-8-hydroxynaphthalene-3,6-disulfonic acid, condensing with 1-amino-8-hydroxynaphthalene-4,6-disulfonic acid and coupling the colored monochlorotriazine with the diazonium salt of 4-(2-sulfatoethylsulfonyl)aniline under the conditions of this Example gave an identical dye.

EXAMPLE 2

The procedure of Example 1 was repeated using

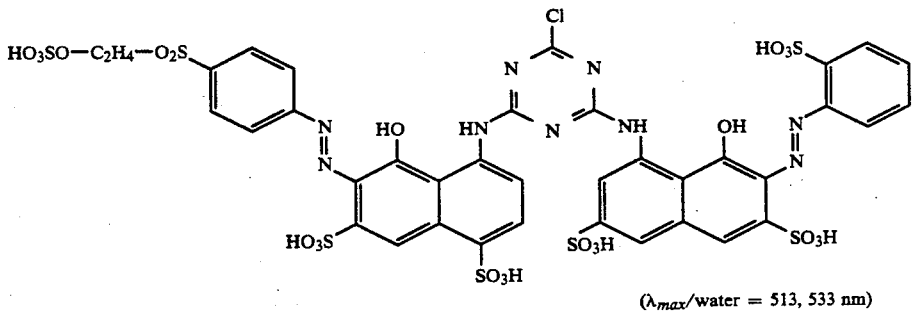

($\lambda_{max}$/water = 513, 533 nm)

was precipitated in the form of the potassium salt, filtered off with suction, washed with 12% by weight potassium chloride solution and, after squeezing, was dried at 30° C. under reduced pressure.

It dyes cellulose materials by the exhaust method at from 40° to 60° C. and by the padding method at room temperature (fixing time from 4 to 8 hours) in a high color yield in a yellowish red having very good performance fastness properties.

alternately 1-amino-8-hydroxynaphthalene-3,6-disulfonic acid and 1-amino-8-hydroxynaphthalene-4,6-disulfonic acid to obtain the dye of formula

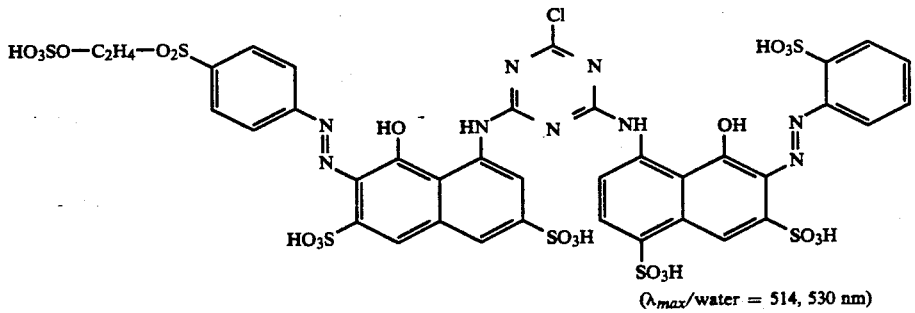

($\lambda_{max}$/water = 514, 530 nm)

which is isomeric to that of the first example and dyes cellulose materials in a medium red shade.

The procedure of Examples 1 and 2 was also used to obtain the dyes listed below in Table 1, which are similar in respect of reactivity and performance characteristics. (The numbers quoted in respect of $K^1$ and $K^2$ refer in each case to the formulae IIa to IIf shown in the description).

TABLE 1
| Ex. No. | Position of reactive radical | K¹ | K² | D | $\lambda_{max}$ [nm] | Hue on cotton |
|---|---|---|---|---|---|---|
| 3 | 4 | IIa | IIb | 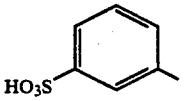 | 526 | red |
| 4 | 4 | IIa | IIb | 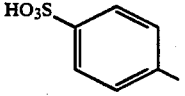 | 513, 533 | red |
| 5 | 4 | IIa | IIb | 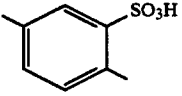 | 518, 534 | red |
| 6 | 4 | IIb | IIa | 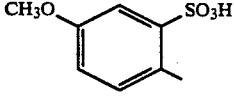 | 515, 535 | bluish red |
| 7 | 4 | IIb | IIa | 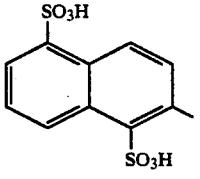 | 523 | bluish red |
| 8 | 4 | IIb | IIa | 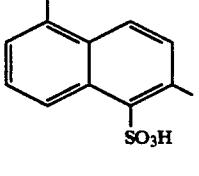 | 518, 540 | bluish red |
| 9 | 4 | IIa | IIb | 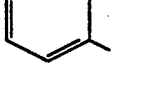 | 518, 539 | red |
| 10 | 4 | IIb | IIb | 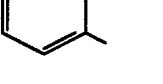 | 514, 537 | bluish red |
| 11 | 4 | IIa | IIa | 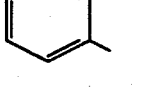 | 509, 527 | yellowish red |
| 12 | 3 | IIb | IIb | | 513, 536 | red |
| 13 | 4 | IIb | IIb | 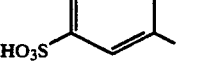 | 517, 536 | bluish red |

TABLE 1-continued
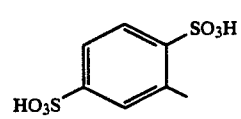
| Ex. No. | Position of reactive radical | K¹ | K² | D | $\lambda_{max}$ [nm] | Hue on cotton |
|---|---|---|---|---|---|---|
| 14 | 4 | IIa | IIb | 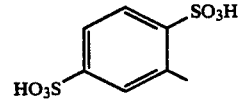 | 517, 533 | red |
| 15 | 3 | IIb | IIb | 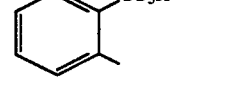 | 513, 535 | red |
| 16 | 3 | IIa | IIa | 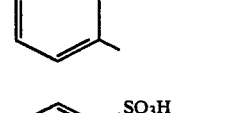 | 508, 525 | yellowish red |
| 17 | 3 | IIb | IIa | 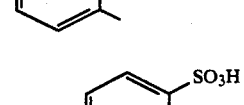 | 517, 531 | red |
| 18 | 3 | IIa | IIb | 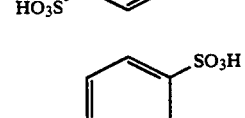 | 513, 531 | red |
| 19 | 4 | IIa | IIf | 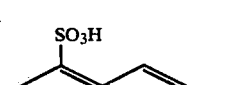 | 508 | red |
| 20 | 4 | IIe | IIa | 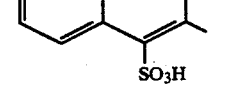 | 505 | yellowish red |
| 21 | 4 | IIb | IIb | 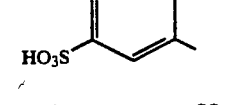 | 518, 542 | bluish red |
| 22 | 4 | IIa | IIb | 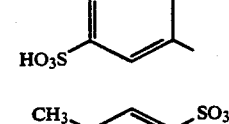 | 529 | bordeaux |
| 23 | 4 | IIa | IIb | 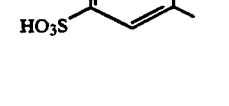 | 520, 533 | red |
| 24 | 4 | IIa | IIb |  | 517, 534 | yellowish red |

TABLE 1-continued $$HO_3SO-C_2H_4-O_2S-\underset{3}{\overset{4}{\bigcirc}}-N=N-K^1 \cdots \text{triazine(Cl)} \cdots K^2-N=N-D$$

| Ex. No. | Position of reactive radical | $K^1$ | $K^2$ | D | $\lambda_{max}$ [nm] | Hue on cotton |
|---|---|---|---|---|---|---|
| 25 | 4 | IIa | IIb | dimethyl-disulfo-phenyl (HO₃S, SO₃H, CH₃, CH₃) | 514 | yellowish red |
| 26 | 4 | IIa | IIb | chloro-methyl-disulfo-phenyl (HO₃S, HO₃S, Cl) | | yellowish red |
| 27 | 4 | IIa | IIb | chloro-methyl-disulfo-phenyl (Cl, SO₃H, HO₃S) | 523, 532 | red |
| 28 | 4 | IIa | IIb | chloro-methyl-disulfo-phenyl (HO₃S, Cl, SO₃H) | 511 | yellowish red |
| 29 | 4 | IIa | IIb | dichloro-sulfo-methyl-phenyl (HO₃S, Cl, Cl) | | bluish red |
| 30 | 4 | IIa | IIb | benzothiazolyl-phenyl (CH₃, SO₃H, SO₃H) | | bordeaux |
| 31 | 4 | IIa | IIb | methoxy-methyl-sulfo-phenyl (CH₃O, SO₃H) | 530 | bordeaux |
| 32 | 4 | IIa | IIb | methoxy-methyl-sulfo-phenyl (CH₃O, SO₃H) | 519, 533 | red |
| 33 | 4 | IIa | IIb | disulfo-methyl-naphthyl (SO₃H, SO₃H) | 518, 539 | red |
| 34 | 4 | IIa | IIb | disulfo-methyl-phenyl (SO₃H, HO₃S) | 515, 531 | yellowish red |

TABLE 1-continued

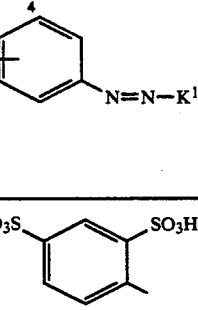

| Ex. No. | Position of reactive radical | K¹ | K² | D | $\lambda_{max}$ [nm] | Hue on cotton |
|---|---|---|---|---|---|---|
| 35 | 4 | IIa | IIb | 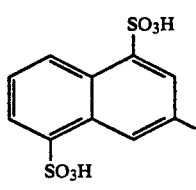 | 519, 533 | yellowish red |
| 36 | 4 | IIa | IIb | 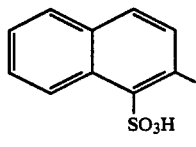 | | bluish red |
| 37 | 4 | IIa | IIb | 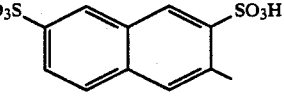 | | red |
| 38 | 4 | IIa | IIb | 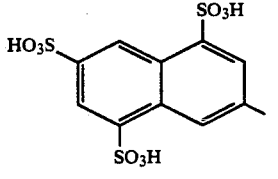 | | red |
| 39 | 4 | IIa | IIb | 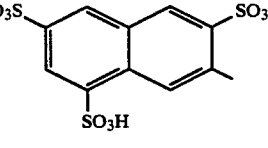 | | bluish red |
| 40 | 4 | IIa | IIb | 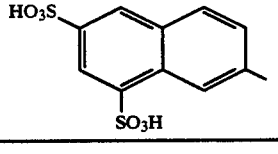 | | red |
| 41 | 4 | IIa | IIb | HO₃S...SO₃H | | bluish red |

EXAMPLE 42

8.65 g of aniline-2-sulfonic acid were diazotized with sodium nitrite (volume about 140 ml) in ice-water which had been acidified with a mineral acid and coupled with 1-(2,6-dichloro-1,3,5-triazin-2-yl)amino-8-hydroxynaphthalene-3,6-disulfonic acid at pH 5 as described in Example 1a for the corresponding 4,6-disulfonic acid.

This is followed by condensation with 1-amino-8-hydroxynaphthalene-4,6-disulfonic acid (pH 5–5.5) and stirring overnight.

24.7 g of the monosodium salt of 2-(4-hydroxysulfonylphenyl)amino-4-(3-amino-4-hydroxysulfonylphenyl)amino-6-chloro-s-triazine were dissolved in 200 ml of water and admixed with 15 ml of aqueous 3.33N sodium nitrite solution. The diazotization reaction was carried out by pouring into 100 g of ice and 15 ml of 30% by weight hydrochloric acid and stirring at 10° C. for one hour.

After the excess nitrous acid had been destroyed, the resulting jelly-like liquid was combined with the colored monochlorotriazine compound obtained above and coupled therewith by buffering with sodium acetate to pH 5.

The completely dissolved dye of the formula

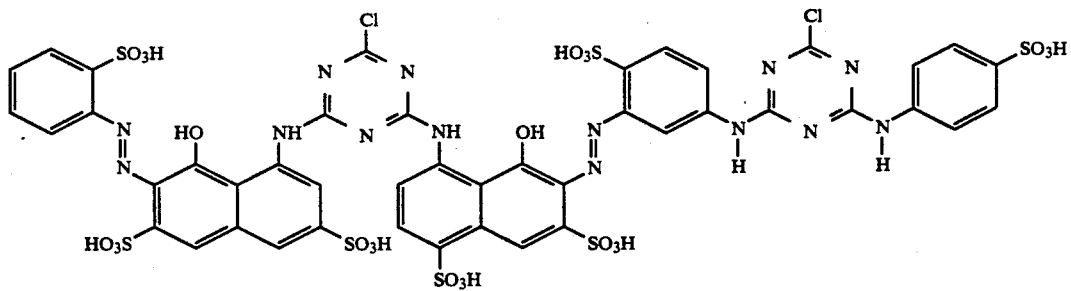

($\lambda_{max}$/water: 525, 538 nm)

was precipitated in the form of the sodium salt and filtered off with suction and thoroughly washed with 12% by weight sodium chloride solution. The expressed filter residue was dried under reduced pressure at 40° C.

The dye thus obtained can be applied to cellulose materials by the cold pad-batch method, by the exhaust method at 60° C. and by the pad-steam method with a high color yield, and it produces thereon a medium red shade having very good performance characteristics.

The procedure of Examples 42 and 1a can be used to obtain the dyes listed in Table 2. They have a similar property profile.

TABLE 2

| No. | D | K¹ | K² | Pos of —NH— | Q | $\lambda_{max}$ [nm] | Hue on cotton |
|---|---|---|---|---|---|---|---|
| 43 | 2-sulfophenyl (SO₃H ortho) | IIb | IIa | 5 | 2-methyl-4-sulfophenyl | 512, 536 | red |
| 44 | 2-sulfophenyl | IIb | IIa | 5 | 2-methyl-5-sulfophenyl | 514, 537 | red |
| 45 | 2-sulfophenyl | IIb | IIb | 5 | 2-methyl-4-sulfophenyl | 510, 527 | bluish red |
| 46 | 2,4-disulfophenyl | IIb | IIb | 5 | 4-sulfophenyl | 517 | bluish red |
| 47 | 2,4-disulfophenyl | IIb | IIb | 5 | 2-methyl-4-sulfophenyl | 528 | bluish red |

TABLE 2-continued
| No. | D | K¹ | K² | Pos of —NH— | Q | $\lambda_{max}$ [nm] | Hue on cotton |
|---|---|---|---|---|---|---|---|
| 48 | 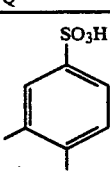 | IIb | IIa | 5 | 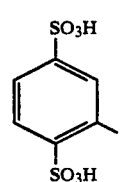 | 513, 536 | red |
| 49 | 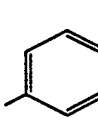 | IIb | IIa | 5 | 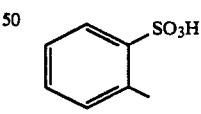 | 512, 536 | red |
| 50 | 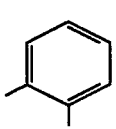 | IIb | IIa | 5 | 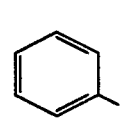 | 512, 536 | red |
| 51 | 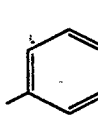 | IIb | IIa | 5 | 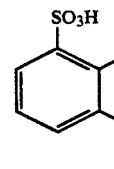 | 530 | bluish red |
| 52 | 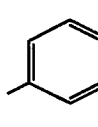 | IIb | IIa | 5 | 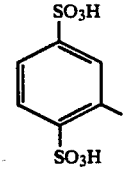 | 520, 542 | bluish red |
| 53 | 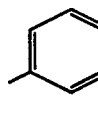 | IIf | IIa | 5 | 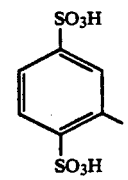 | 510 | yellowish red |
| 54 | 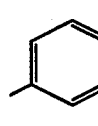 | IIa | IIe | 5 | 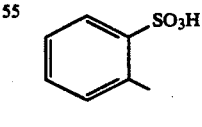 | 508 | yellowish red |
| 55 | 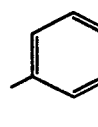 | IIb | IIa | 4 |  | 540 | violet |

TABLE 2-continued

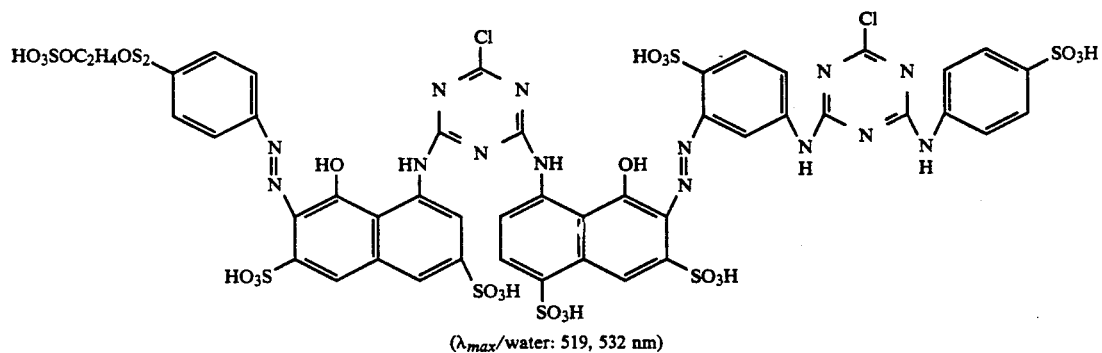

| No. | D | K¹ | K² | Pos of —NH— | Q | $\lambda_{max}$ [nm] | Hue on cotton |
|---|---|---|---|---|---|---|---|
| 56 | (2-methylphenyl-SO₃H) | IIb | IIa | 4 | (2-methylphenyl-SO₃H) | 539 | violet |

EXAMPLE 57

The compound of the formula

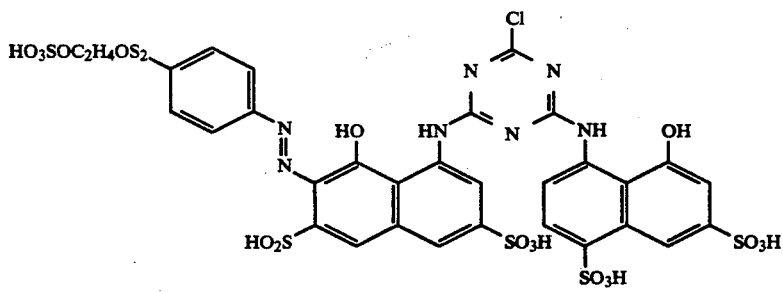

obtained as intermediate in Example 2 was coupled with the diazonium salt of 2-(4-hydroxysulfonylphenyl)amino-4-(3-amino-4-hydroxysulfonylphenyl)amino-6-chloro-s-triazine (Example 42) at pH 5.5–6. The dye of the formula ($\lambda_{max}$/water: 519, 532 nm)

was isolated in the form of the potassium salt and dyes cotton materials by the exhaust method and by the cold pad-batch method in a medium red shade with very high degrees of fixation.

The same method is used to obtain the dyes listed below in Table 3.

TABLE 3

HO₃SOC₂H₄O₂S—[phenyl(4,3)]—N=N—K¹—[chlorotriazine]—K²—N=N—[phenyl with HO₃S(4), NH(5)]—[chlorotriazine with Cl]—NH—Q

| Ex No. | Pos. of —SO₂— | K¹ | K² | Pos. of —NH— | Q | $\lambda_{max}$ [nm] | Hue of cotton |
|---|---|---|---|---|---|---|---|
| 58 | 4 | IIb | IIa | 5 | benzene-1,4-di-SO₃H (2,5-disulfo) | 520, 531 | bluish red |
| 59 | 3 | IIb | IIa | 5 | 4-methylbenzene-SO₃H | 519, 521 | red |
| 60 | 4 | IIa | IIa | 5 | 4-methylbenzene-SO₃H | 515, 525 | red |
| 61 | 3 | IIa | IIa | 5 | 4-methylbenzene-SO₃H | 514, 523 | yellowish red |
| 62 | 4 | IIb | IIa | 4 | 4-methylbenzene-SO₃H | 532 | violet |

EXAMPLE 63

0.05 mol of 1-(2,6-dichloro-1,3,5-triazin-2-yl)amino-7-(2-hydroxysulfonylphenylazo)-8-hydroxynaphthalene-3,6-disulfonic acid, described in Example 42, was admixed in aqueous solution at pH 5 with 9.5 g of 3-aminoaniline-4-sulfonic acid, and the mixture was buffered at room temperature to pH 5 with sodium bicarbonate. When, after stirring under these conditions for three hours, dichlorotriazine was no longer detectable, 0.05 mol was added of 1-(2,6-dichloro-1,3,5-triazin-2-yl)amino-7-[4-(2-sulfatoethylsulfonyl)phenylazo]-8-hydroxynaphthalene-4,6-disulfonic acid, obtained as in Example 1, in the form of the reaction mixture, and the mixture was stirred at 35° C. and pH 5, with sodium acetate, for three hours. After the monochlorotriazine had reacted in full, the dye of the formula was precipitated in the form of the potassium salt, filtered off with suction and thoroughly washed with 10% by weight potassium chloride solution. The dye thus obtained dyes cellulose materials by the exhaust method at 40°–60° C. and by the cold pad-batch method at room temperature in a medium red shade with excellent color yield.

It is also possible to react the dissolved intermediate 1-[6-chloro-4-(3-amino-4-hydroxysulfonylphenyl-)amino-1,3,5-triazin-2-yl]-amino-7-(2-hydroxysulfonylphenylazo)-8-hydroxynaphthalene-3,6-disulfonic acid either at 0°–10° C. and pH 5 with cyanuric chloride and then at pH 5 at room temperature with 1-amino-8-hydroxynaphthalene-4,6-disulfonic acid or at from 35° to 40° C. and pH 5–5.5 with 1-(4,6-dichloro-1,3,5-triazin-2-yl)amino-8-hydroxynaphthalene-4,6-disulfonic acid. In either case the final product is prepared by

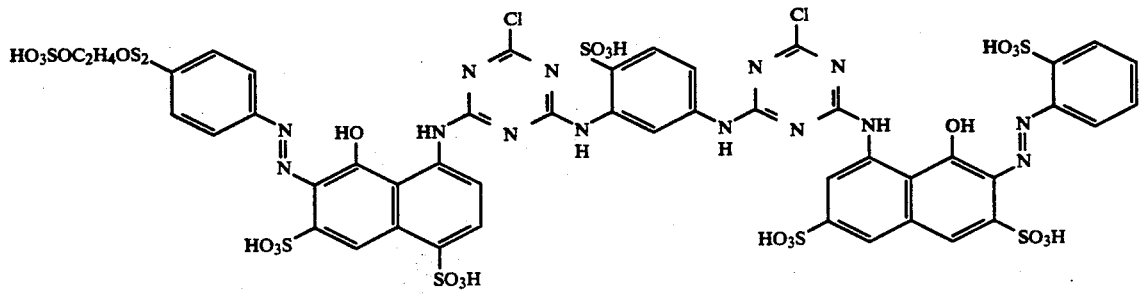

coupling with the diazonium salt of 4-(2-sulfatoethylsulfonyl)aniline at a pH of 3.

EXAMPLE 64

Example 63 was carried out in reverse order in that 1-[6-chloro-4-(3-amino-4-hydroxysulfonylphenyl-)amino-1,3,5-triazin-2-yl]amino-7-[4-(2-sulfatoethylsulfonyl)phenylazo]-8-hydroxynaphthalene-4,6-disulfonic acid was reacted with cyanuric chloride, 1-amino-8-hydroxynaphthalene-3,6-disulfonic acid and the compound of the formula

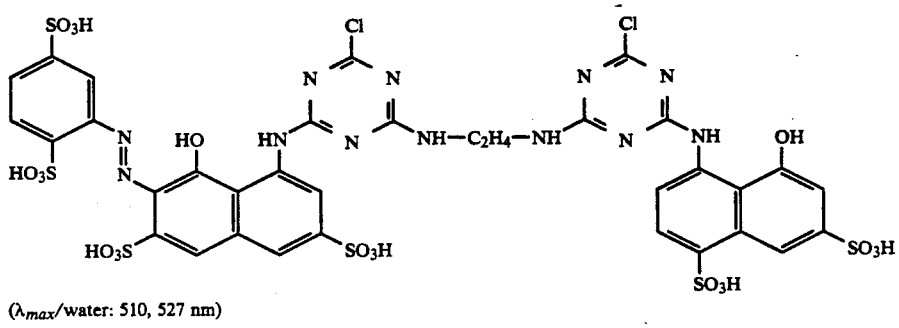

($\lambda_{max}$/water: 510, 527 nm)

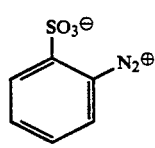

fonic acid (obtained from the corresponding dichlorotriazinylaminohydroxynaphthalenesulfonic acid and ethylenediamine at 40° C. and pH 6) were mixed with 250 ml of water and admixed at a pH of 4.5-5 with the equimolar amount of the diazonium salt of aniline-2,5-disulfonic acid. To this solution there were added 26 g of cyanuric chloride in a solution of acetone, and the mixture was stirred at 20° C. and a pH of 6 overnight. Following the addition of 33.5 g of 1-amino-8-hydroxynaphthalene-4,6-disulfonic acid and stirring overnight at room temperature at pH 5 the solution was clarified by filtration and the compound of the formula was precipitated in the form of the potassium salt and isolated.

0.05 mol of this compound was dissolved in 250 ml of water and coupled with the equivalent amount of the diazonium salt of 4-(2-sulfatoethylsulfonyl)aniline (from Example 1) at pH 3.

The dye of the formula

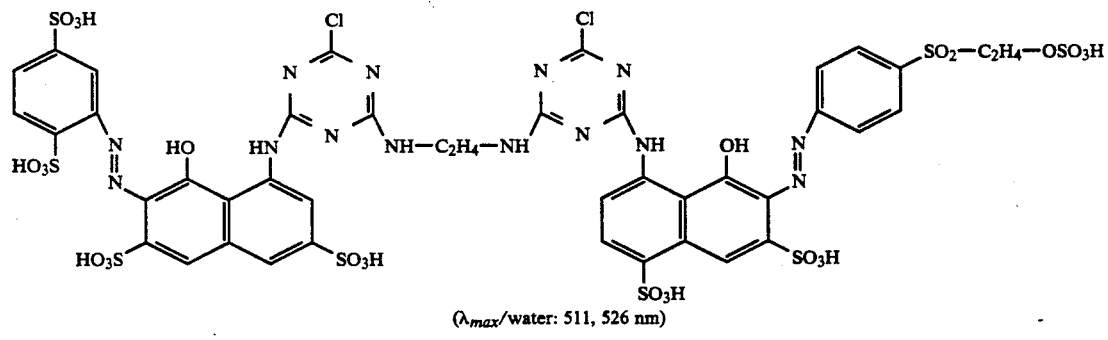

($\lambda_{max}$/water: 511, 526 nm)

to give the dye of the formula precipitated in the form of the potassium salt and iso-

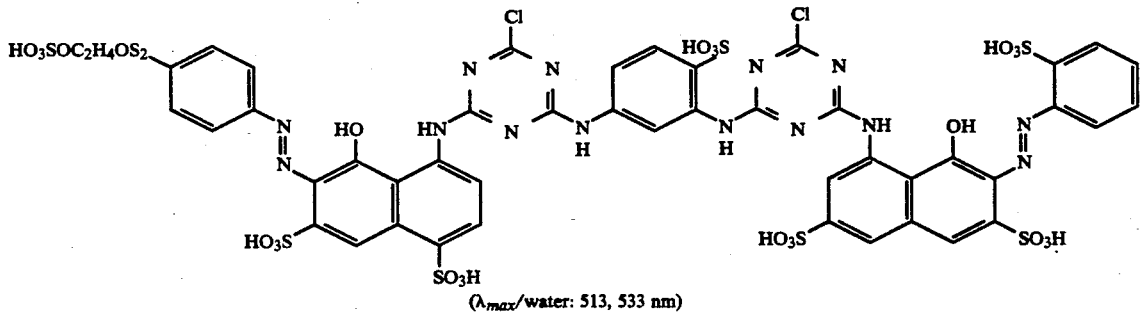

($\lambda_{max}$/water: 513, 533 nm)

which is isomeric to the dye of Example 63 and has similar properties.

EXAMPLE 65

49.1 g of 1-[4-(2-aminoethylamino)-6-chloro-1,3,5-triazin-2-yl]amino-8-hydroxynaphthalene-3,6-d-isullated dyes cotton materials by the exhaust method and by the cold pad-batch method in a medium red shade with a very high color yield and with very good performance fastness properties.

We claim:

1. A reactive dye of the formula I

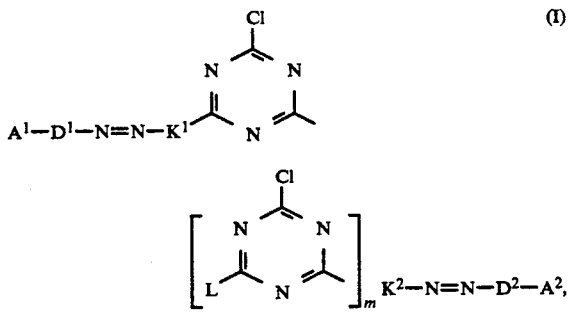

where
m is 0 or 1,
$A^1$ and $A^2$ are different from each other and each is an additively fiber-reactive radical or a substitutively fiber-reactive radical or else, in the case of $A^2$, hydrogen, with the proviso that no more than one of $A^1$ and $A^2$ is a substitutively fiber-reactive radical and no more than one of $A^1$ and $A^2$ is an additively fiber-reactive radical,
$D^1$ and $D^2$ are identical or different and each is independently of the other substituted or unsubstituted phenylene, substituted or unsubstituted phenylenemethyl, substituted or unsubstituted naphthylene or substituted or unsubstituted naphthylenemethyl,
$K^1$ and $K^2$ are identical or different and each is independently of the other the radical of a coupling component of the aminonaphthalenesulfonic acid series, and L is a bridge member.

2. A reactive dye as claimed in claim 1, wherein m is 0.

3. A reactive dye as claimed in claim 1, wherein $D^1$ and $D^2$ are each independently of the other unsubstituted or hydroxysulfonyl-monosubstituted or -disubstituted phenylene or unsubstituted or hydroxysulfonyl-monosubstituted, -disubstituted or -trisubstituted naphthylene.

4. A reactive dye which conforms to the formula Ia

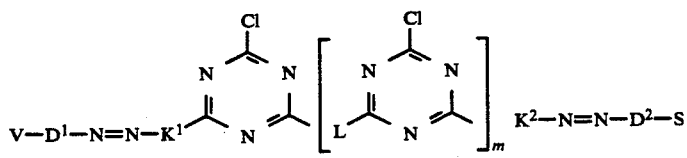

where

V is 2-chloroethylsulfonyl or a 2-hydroxyethylsulfonyl radical which has been esterified with an inorganic or organic acid and forms vinylsulfonyl under dyeing conditions,
S is a substitutively fiber-reactive radical, $D^1$ and $D^2$ are identical or different and each is independently of the other substituted or unsubstituted phenylene, substituted or unsubstituted phenylenemethyl, substituted or unsubstituted naphthylene or substituted or unsubstituted naphthylenemethyl, $K^1$ and $K^2$ are identical or different and each is independently of the other the radical of a coupling component of the aminonaphthalenesulfonic acid series, and L is a bridge member.

5. A reactive dye which conforms to the formula Ib

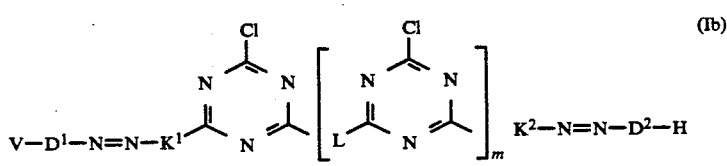

where
V is a 2-hydroxyethylsulfonyl radical which has been esterified with an inorganic or organic acid and forms vinylsulfonyl under dyeing conditions, $D^1$ and $D^2$ are identical or different and each is independently of the other substituted or unsubstituted phenylene, substituted or unsubstituted phenylenemethyl, substituted or unsubstituted naphthylene or substituted or unsubstituted naphthylenemethyl, $K^1$ and $K^2$ are identical or different and each is independently of the other the radical of a coupling component of the aminonaphthalenesulfonic acid series, and L is a bridge member.

6. A reactive dye which conforms to formula Ic

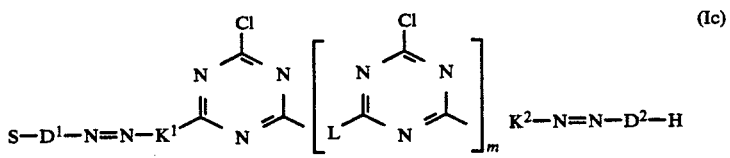

where
S is a substitutively fiber-reactive radical, $D^1$ and $D^2$ are identical or different and each is independently of the other substituted or unsubstituted phenylene, substituted or unsubstituted phenylenemethyl, substituted or unsubstituted naphthylene or substituted or unsubstituted naphthylenemethyl, $K^1$ and $K^2$ are identical or different and each is independently of the other the radical of a coupling component of the aminonaphthalenesulfonic acid series, and L is a bridge member.

7. A process of dyeing or printing hydroxyl- or nitrogen-containing organic substrates comprising applying thereto a reactive dye as claimed in claim 1.

* * * * *